United States Patent [19]

Jonsson et al.

[11] Patent Number: 5,249,469
[45] Date of Patent: Oct. 5, 1993

[54] PRESSURE GAUGE

[75] Inventors: Staffan Jonsson, Sollentuna, Sweden; Ray Olsson, Hammarlund, Finland

[73] Assignee: Jonsson & Billquist Development AB, Stockholm, Sweden

[21] Appl. No.: 634,196
[22] PCT Filed: May 17, 1989
[86] PCT No.: PCT/SE89/00270
 § 371 Date: Jan. 17, 1991
 § 102(e) Date: Jan. 17, 1991
[87] PCT Pub. No.: WO89/11640
 PCT Pub. Date: Nov. 30, 1989

[30] Foreign Application Priority Data

May 17, 1989 [SE] Sweden .................................. 8801848

[51] Int. Cl.$^5$ ............................................. G01L 9/12
[52] U.S. Cl. ........................................ 73/724; 73/718; 361/283.4
[58] Field of Search .............. 73/724, 718; 361/283; 29/25.41

[56] References Cited

U.S. PATENT DOCUMENTS

| | | | |
|---|---|---|---|
| 2,714,703 | 8/1955 | Ruderfer | 73/724 |
| 3,619,742 | 11/1971 | Reed | 317/246 |
| 4,168,517 | 9/1979 | Lee | 361/283 |
| 4,358,814 | 11/1982 | Lee et al. | 361/283 |
| 4,389,895 | 6/1983 | Rud, Jr. | 73/724 |
| 4,415,948 | 11/1983 | Grantham et al. | 361/283 |
| 4,562,742 | 1/1986 | Bell | 73/718 |
| 4,586,109 | 4/1986 | Peters et al. | 361/283 |
| 4,609,966 | 9/1986 | Kuisma | 361/283 |
| 4,823,603 | 4/1989 | Ferran et al. | 73/724 |
| 4,875,134 | 10/1989 | Kuisma | 361/282 |
| 4,935,841 | 6/1990 | Jonsson et al. | 361/283 |

FOREIGN PATENT DOCUMENTS

| | | |
|---|---|---|
| 095966 | 12/1983 | European Pat. Off. |
| 3404262 | 9/1984 | Fed. Rep. of Germany |
| 56-141531 | 11/1981 | Japan |
| 58-26237 | 2/1983 | Japan |
| WO88/06281 | 8/1988 | World Int. Prop. O. |

Primary Examiner—Donald O. Woodiel
Attorney, Agent, or Firm—Limbach & Limbach

[57] ABSTRACT

A pressure gauge is provided comprising a sensor housing (1) closed by a cover (7). The sensor housing (1) is connected to a tube (3) containing the pressure to be measured. The space defined by the sensor housing (1) and the cover (7) is hermetically divided by a sensor housing cover (9) in such a way that inside a front measurement volume (11) a pressure sensor means (15) is placed. This pressure sensor means has a substantially flat shape. It is connected to the interior walls of the front volume by means of tubes (23) which are slender or slim, that is have a small section in relation to the area of the pressure sensor means (15). The carrying means (23) are preferably realized as metal tubes and in their interior the electrical connections (31) for the pressure sensor means pass. By this construction the exterior surface of the whole of the pressure sensor means (15) will be subjected to the measuring pressure. Further an attachment to the pressure sensor housing is provided only allowing a slight convection of heat and in addition the measuring volume does not contain any chemically unstable materials. The electrical connections are also well protected against corrosion by the measurement medium and obtain an electrical shielding.

20 Claims, 1 Drawing Sheet

FIG_1
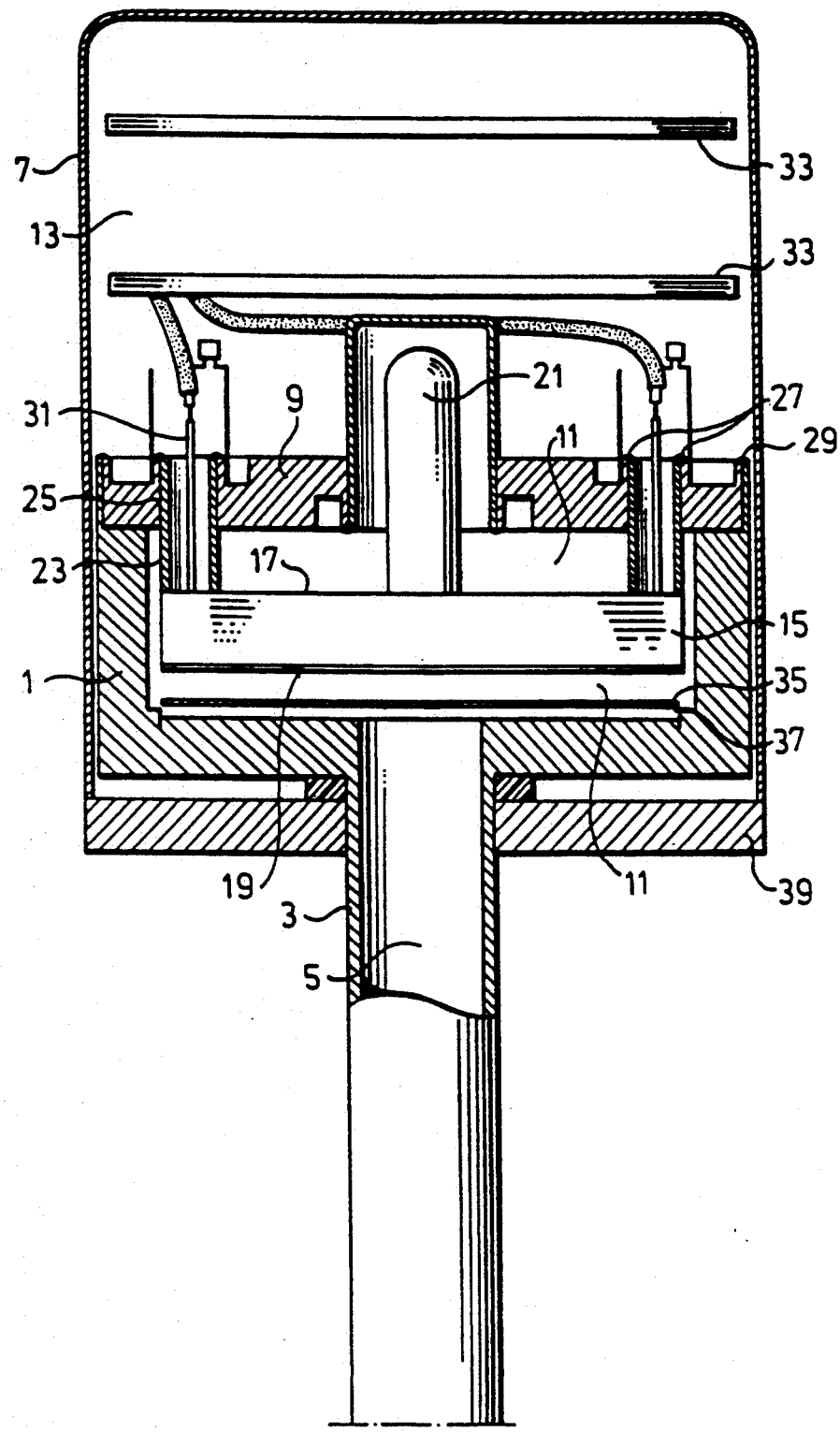

PRESSURE GAUGE

TECHNICAL FIELD OF THE INVENTION

The present invention relates to a pressure gauge comprising a hollow volume and a pressure sensing means mounted in this volume. The pressure sensor means has a conventional construction and comprises a substantially rigid, not flexible support plate and a flexible diaphragm attached to said support plate. Between said support plate and diaphragm is in this way formed a closed space which contains a reference pressure. The deflection of said diaphragm for different exterior pressures acting on said diaphragm is detected electrically by means of electrodes arranged on said diaphragm and/or support plate. Thus the support plate and membrane may be configured as a capacitor, the capacitance of which is sensed by means of suitable electronic circuits. The hollow volume in which the pressure sensor means is mounted has a free gas connection to the volume where the pressure is to be measured.

BACKGROUND OF THE INVENTION

Pressure sensor means of the type indicated above are described e.g. in the Swedish patent application 8700556-7 which is available to the public and has been filed by the applicant.

For pressure gauges of the kind mentioned above various problems are raised in relation to the attachment of said pressure sensor means to the interior surface of the surrounding hollow volume. Generally the desires for and demands on a pressure gauge having a high precision, intended both for measuring low pressures and pressures originating from corrosive gases, may be summarized in the following way.

1. The whole of said pressure sensor means should be freely hanging or standing in the measuring volume inside the hollow volume in such a way that the pressure being measured, besides acting on said diaphragm, also acts on the whole of said pressure sensor means. No forces should influence the mechanical construction, particularly the support plate, of the pressure sensor means, which is displaced due to the relation of the measured pressure to the reference pressure inside said pressure sensor means.

A mounting of this kind will among other things result in the fact that the values provided by said pressure sensor means are given an increased repeatability when the pressure sensor means is subjected to varying pressures.

2. The freely hanging or standing pressure means should be mounted in such a way that the means attaching the pressure sensor means to the inner surface of the surrounding hollow volume has a small sectional area compared to the large, substantially flat surfaces of the pressure sensor means.

Such an attachment of the pressure sensor means naturally has a relation to the desire mentioned under point 1. that no forces or as small forces as possible, besides the pressure to be measured, should influence the pressure sensor means. In addition a reduced temperature convection may in this way be obtained between the walls of the surrounding hollow volume and the pressure sensor means.

3. The attachment means by means of which the pressure sensor means is attached inside the hollow volume should be mechanically connected partly to the pressure sensor means, partly to the interior wall of the surrounding hollow volume in such a way that the connecting joints do not comprise any type of soldering or elastomer. Only weld joints and glass joints should be allowed to be used.

This requirement has a direct connection to the object of being able to use the pressure gauge for measurement of both very low pressures and for pressures generated by corrosive media.

4. The electric conductors connecting the electrodes of said pressure sensor means to the exterior of the surrounding hollow volume should not be subjected to the gases in the measuring volume. If the electric conductors were to pass through said measurement volume this would influence the capacitive measurement or totally disable this.

First it will be observed that the desire under point 3. for certain cases possibly could be obtained by means of a reconstruction of constructions known in the art, e.g. by a choice of material allowing mechanical connections such as welds or glass joints.

However, the requirements or desires under the points 1. and 2. may be satisfied in different ways, for instance as in illustrated in the Japanese patent applications 56-141531 and 58-26237 and the U.S. Pat. No. 4,358,814. In these constructions known in the art the mechanical means connecting the support plate of said pressure sensor means to the wall of the surrounding hollow volume is located centrally and in addition has a small section in relation to the area of the large surfaces of said pressure sensor means.

In the cited U.S. patent publication this attachment means is realized in the shape of a tube. However, this pressure gauge known in the art is not totally comparable to the type of pressure gauge to which the present application is related, since said support plate in the previously known construction has not a substantially flat shape.

The requirement indicated under point 4. is satisfied according to the invention by the features set out in the characterizing part of the claim 1.

Thus, the pressure sensor means is attached to and only connected to the wall of the surrounding hollow volume by means of at least one tube, the section of which is small in relation to the area of the large surface of the support plate and the diaphragm of said pressure sensor means. This can be achieved by the fact that the connecting leads to the sensing electrodes of said pressure sensor means pass inside this tube or these tubes.

In this context reference can be made to the U.S. Pat. Nos. 3,619,742 and 4,168,517. In these patent publications pressure gauges are disclosed having pressure sensor means, the flexible diaphragm and a rigid support plate of which are influenced by different pressures, e.g. by the measurement pressure and substantially the atmospheric pressure respectively. However, in these kinds of pressure gauges it may also be advantageous to make the electric connection or the electric connections pass through a tube, in this case generally made of metal and providing an electrical shielding of the measurement wire. In these cases, however, see particularly the U.S. Pat. No. 3,619,742, said tube has no carrying or supporting effect.

SUMMARY OF THE INVENTION

Preferably the pressure sensor means according to the invention is made of a ceramic material or of a glass ceramic which are electrically not conducting materials. The diaphragm and supporting plate of said pressure sensor means are connected to each other by means of some suitable type of sintered glass joint. In a manner which is previously known the exterior of said pressure sensor means may preferably be provided with an electrically conducting layer in order to electrically shield the interior of said pressure sensor means.

The tube or tubes connecting said pressure sensor means to the surrounding housing of the pressing gauge further is made preferably of metal. These metal tubes may be welded and/or glassed to the large surface of the supporting plate and to the inner wall of the surrounding hollow volume, the sensor housing. Further, apparently these connecting tubes will in this case also act as an electrical shield of the connecting wires passing inside said tubes.

BRIEF DESCRIPTION OF THE DRAWING

The invention will now be described with reference to the accompanying drawing which illustrates sectionally an embodiment of the pressure gauge according to the invention.

DETAILED DESCRIPTION OF THE INVENTION

The pressure gauge illustrated in the figure comprises a sensor housing 1, which is a cylindrical enlargement of or may be mounted on a tube conduit 3, in the interior 5 of which the pressure is present which is to be measured. The sensor housing is more or less hermetically closed by a cap 7 in such a way that an inner hollow volume is formed. The sensor housing 1 is usually made of steel and the sensor housing cap 7 may be made of steel plate or possibly plastics. Said inner space is divided into two volumes by an inner sensor housing cover 9 in such a way that a front volume 11 is defined. This front volume 11 is connected to the pressure to be measured and thus forms a measuring volume. Also a rear volume 13 is formed which is approximately at atmospheric pressure.

In the front volume or measurement volume, further the pressure sensor means 15 is mounted. This is a ceramic sensor means and comprise a supporting plate having an outer surface 17 and a diaphragm having an outer surface 19 facing said tube conduit 3. The details of said sensor means are not illustrated on the figure since this type of pressure sensor elements are well known in the art, see for instance the Swedish patent application cited above.

On the support plate of said pressure sensor means 15 also, as is shown in the figure, a protruding part or extension 21 may be located acting as a getter tube and also being intended for evacuation of the interior volume of said pressure sensor means. This interior space of said pressure sensor means is not visible in the figure but contains a determined reference pressure being for instance $1 \times 10^{-8}$ torr and usually also of the same magnitude of order as the pressure to be measured.

The pressure sensor means 15 is connected to the sensor housing cover 9 by means of for instance two cylindrical carrying tubes 23. These are realized of a suitable metal, the thermal dilatation coefficient of which essentially coincides with the thermal dilatation coefficient of the ceramic material of said pressure sensor means 15. The carrying tubes are thus attached by means of glass joints to said pressure sensor means as is shown in the figure on the outer surface of the supporting plate and at the outer borders thereof and perpendicular to the surface of the supporting plate. The other ends of said carrying tubes 23 are inserted through bores 25 into the pressure sensor housing cover 9, this being essentially parallel to the pressure sensor means 15. On the rear side of said sensor housing cover 9, i.e. the side which does not face said pressure sensor means 15, the carrying elements 23 are welded to the sensor housing cover 9 by means of welded joints 27. To reduce the thermal tensions also the sensor housing cover 9 is suitably also made of the same material as the mounting elements 23.

In order to make the front volume or the measurement volume 11 quite hermetically closed in relation to the atmospheric pressure the sensor housing cover 9 also is welded to the sensor housing 1 at the outer borders thereof by means of a circumferential weld joint 29.

In the interior of said mounting elements 23 the electric conductors pass towards the electrodes of the pressure sensor means 15. Preferably the pressure sensor means is of the capacitive type and thus has electrically conducting electrodes coated both on said supporting plate and on said diaphragm, at least two electrodes of which are connected to the associated measurement electronic circuits. The electric wires 31 may be electrically isolated from the carrying means 23 by a medium like air, glass, sodium line glass, glass ceramics, gas or isolating paste or plastics. Usually air is preferred, however, since the electric conductors 31 are totally located in the rear volume 13 being essentially at the atmospheric pressure. The electric wires then pass to the electronic circuits which may be arranged on the two circuit boards 33. These circuit boards may, as is shown in the figure, be arranged in the rear region 13 of the pressure gauge which is at atmospheric pressure.

When the pressure gauge is used for measurement of the pressure of gases containing ionized particles, for instance as used for various plasma procedures, it may be convenient to protect the pressure sensor means from a direct bombardment of particles by means of a plasma shield 35 arranged in front of the diaphragm surface 19 of the pressure sensor means 15. The plasma shield contains recesses at its border 37 in such a way that the whole of the volume surrounding said pressure sensor means 15 has the same pressure as the interior of the tube conduit 3.

In order to protect it, for certain installations of the pressure gauge, even more against damaging heat effects a thermal shield 39 may be arranged around the tube 3, in which the pressure is to be measured. The heat shield 39 may consist of an aluminum plate and is provided with a central bore for the tube 3. At the outer borders of said plate 39 further, the protecting cap 7 of the pressure sensor means is attached in such a way that the protecting cap is located at a small distance of the sensor housing 1. In this way a space containing air is obtained, surrounding the sensor housing at the outer sides thereof and improving the thermal isolation thereof.

As a summary, from the construction according to the invention the following substantial improvements are obtained:

1. The measuring volume does not contain any chemically unstable components but consists of metal and a ceramical sensor element. The pressure sensor element can have its outer surface coated, by means of thin or thick film methods, with an electrically conducting shielding, preferably connected to the electrically conducting carrying tubes 23 and which can consist of platinum, nickel, silver platinum, silver palladium or titanic nitride.

2. The sensor means is retained quite rigidly without the assistance of materials, which are essentially resilient or elastic. This will improve the repeatability of said pressure gauge at a repeated cycling of the pressure gauge in relation to for instance the atmospheric pressure. It is well known that conventional O-rings in cyclings of this kind will change when time passes on.

3. For certain previously known mountings of pressure elements, as is mentioned above, the whole rear side of the pressure element is subjected to the atmospheric pressure. This may imply a slight bending of the parts of the pressure sensor means, for instance the supporting plate. This effect also may cause a reduced repeatability over longer cycling times. In the construction according to the invention only a surface, which is the sectional area of the carrying elements, is subjected to the atmospheric pressure, whereby the influence of the atmospheric pressure on the pressure sensor means is minimized.

4. By the fact that the carrying means 23 have a small section in relation to the pressure sensor means 25 and in relation to the other components of the sensor housing, particularly the sensor housing plate 9, the influence of changes of the exterior temperature on the pressure sensor means 15 are reduced. The thermal conduction through the carrying tubes 23 is naturally small and the convection of the exterior atmosphere is limited to those small surfaces of the supporting plate surface 17, which are located inside the carrying tubes 23. This will result in the fact that the pressure sensor, regarded totally, will be relatively insensitive to occasional temperature changes.

To one skilled in the art it will be understood that certain modifications may be done in the construction described without departing from the essence of the invention. Thus the carrying means 23 must not be two cylindrical tubes; they may be one or more carrying elements, e.g. only one tube located centrally or at the periphery, which may have a rectangular or square section. Further it is possible to arrange the carrying elements 23 also having their longitudinal direction essentially parallel to the surfaces of the pressure sensor means 15.

We claim:

1. A pressure gauge comprising:
   a hollow volume having a surrounding wall;
   a pressure sensor means having a substantially flat shape, said pressure sensor means comprising a substantially non-flexible supporting plate and a flexible diaphragm attached to said supporting plate, in order to define a closed space between said supporting plate and said diaphragm, said closed space containing a reference pressure, the bending or deflecting of said diaphragm being sensed by means of electrodes located on said diaphragm and/or said supporting plate, said electrodes having connecting leads;
   wherein said pressure sensor means further is located in said hollow volume, which is connected to the pressure to be measured in such a way that a fluid connection is present between said volume at its surfaces, whereby both the exterior surface of said diaphragm and the exterior surface of said supporting plate are influenced by the same pressure;
   said pressure sensor means is attached to a wall of said hollow volume only by means of at least one tube, the sectional area of which is small in relation to the area of the large surfaces of the supporting plate and of said diaphragm of said pressure sensor means; and
   said connecting leads to the sensing electrodes of the pressure sensor means pass inside said tube or tubes.

2. A pressure gauge according to claim 1, wherein said tube or tubes are arranged at said supporting plate of said pressure sensor means having their axes essentially perpendicular to the surface of said supporting plate.

3. A pressure gauge according to claim 1, wherein said tube or tubes are arranged having their axes essentially perpendicular to a wall of said hollow volume where said pressure sensor means is located.

4. A pressure gauge according to claim 1, wherein said tube or tubes are arranged on said supporting plate of said pressure sensor means adjacent to the outer borders of said supporting plate.

5. A pressure gauge according to claim 1, wherein said tube or tubes are made of metal.

6. A pressure gauge according to claim 1, wherein said supporting plate and said diaphragm of said pressure sensor means are made of a ceramic or glass ceramic, electrically non-conducting material.

7. A pressure gauge according to claim 6, wherein an electrically conducting layer is arranged on the outer surface of said pressure sensor means.

8. A pressure gauge according to claim 7, wherein said tube or tubes are made of metal and are electrically conductingly connected to the electrically conducting layer arranged on the outer surface of said pressure sensor means.

9. A pressure gauge according to claim 1, wherein the tube or tubes are made of metal and are attached to said pressure sensor means and the surrounding wall by means of welded joints and/or glass joints.

10. A pressure gauge according to claim 1, wherein said tube or tubes are arranged on said supporting plate of said pressure sensor means adjacent to the outer borders of said supporting plate.

11. A pressure gauge comprising:
    a hollow volume having a surrounding wall;
    a pressure sensor means having a substantially flat shape, said pressure sensor means comprising a supporting plate and a flexible diaphragm attached to said supporting plate, the bending or deflection of said diaphragm being sensed by means of electrodes located on said diaphragm and/or said supporting plate, said electrodes having connecting leads;
    said pressure sensor means further being located in said hollow volume, which is connected to the pressure to be measured;
    wherein said pressure sensor means is attached to a wall of said hollow volume only by means of at least one unitary metal tube, the sectional area of which is small in relation to the area of the large surfaces of said supporting plate and of said diaphragm of said pressure sensor means;
    said connecting leads to the sensing electrodes of the pressure sensor means pass inside said tube or tubes;
    whereby the tube or tubes will only negligibly influence the thermal balance of said pressure sensor means, impose negligible mechanical stresses on said pressure sensor means and also act as an electrical shielding of said connecting leads.

12. A pressure gauge according to claim 11, wherein said tube or tubes are arranged at said supporting plate of said pressure sensor means having their axes essentially perpendicular to the surface of said supporting plate.

13. A pressure gauge according to claim 11, wherein said tube or tubes are arranged having their axes essentially perpendicular to a wall of said hollow volume where said pressure sensor means is located.

14. A pressure gauge according to claim 11, wherein said supporting plate and said diaphragm of said pressure sensor means are made of a ceramic or glass ceramic, electrically nonconducting material.

15. A pressure sensor according to claim 14, wherein an electrically conducting layer is arranged on the outer surface of said pressure sensor means.

16. A pressure gauge comprising;
a hollow volume having a surrounding wall;
a pressure sensor means having a substantially flat shape, said pressure sensor means comprising a supporting plate and a flexible diaphragm attached to said supporting plate, the bending or deflection of said diaphragm being sensed by means of electrodes located on said diaphragm and/or said supporting plate, said electrodes having connecting leads;
said pressure sensor means further being located in said hollow volume, which is connected to the pressure to be measured;
wherein said pressure sensor means is attached to a wall of said hollow volume only by means of at least two tubes, arranged at said supporting plate of said pressure sensor means having their axes essentially perpendicular to the surface of said supporting plate and adjacent to the outer borders of said supporting plate; and
said connecting leads to the sensing electrodes of said pressure sensing means pass inside said tube or tubes.

17. A pressure gauge according to claim 16, wherein said tube or tubes are arranged at said supporting plate of said pressure sensor means having their axes essentially perpendicular to the surface of said supporting plate.

18. A pressure gauge according to claim 16, wherein said tube or tubes are arranged having their axes essentially perpendicular to a wall of said hollow volume where said pressure sensor means is located.

19. A pressure gauge according to claim 16, wherein said supporting plate and said diaphragm of said pressure sensor means are made of a ceramic or glass ceramic, electrically nonconducting material.

20. A pressure sensor according to claim 19, wherein an electrically conducting layer is arranged on the outer surface of said pressure sensor means.

* * * * *